US008553932B2

(12) United States Patent
Barbier et al.

(10) Patent No.: US 8,553,932 B2
(45) Date of Patent: Oct. 8, 2013

(54) OPTICAL SCANNING-BASED SYSTEM FOR DETECTING POSITION AND/OR ORIENTATION OF OBJECTS

(75) Inventors: Bruno Barbier, Bordeaux (FR); Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 958 days.

(21) Appl. No.: 12/566,958

(22) Filed: Sep. 25, 2009

(65) Prior Publication Data
US 2010/0085581 A1  Apr. 8, 2010

(30) Foreign Application Priority Data

Sep. 26, 2008 (FR) ...................................... 08 05316

(51) Int. Cl.
*G06K 9/00* (2006.01)
(52) U.S. Cl.
USPC .......................................... 382/103; 382/106
(58) Field of Classification Search
None
See application file for complete search history.

(56) References Cited

U.S. PATENT DOCUMENTS

| | | | | |
|---|---|---|---|---|
| 4,413,186 A | * | 11/1983 | Uema | 250/491.1 |
| 5,227,985 A | * | 7/1993 | DeMenthon | 702/153 |
| 5,465,177 A | | 11/1995 | Barbier et al. | |
| 5,534,689 A | | 7/1996 | Barbier et al. | |
| 5,661,608 A | | 8/1997 | Barbier et al. | |
| 5,742,394 A | | 4/1998 | Hansen | |
| 5,767,524 A | | 6/1998 | Barbier et al. | |
| 5,767,960 A | * | 6/1998 | Orman | 356/139.03 |
| 6,473,167 B1 | * | 10/2002 | Odell | 356/139.03 |
| 7,106,898 B2 | * | 9/2006 | Bouguet et al. | 382/154 |
| 7,412,089 B2 | * | 8/2008 | Squires et al. | 382/103 |
| 7,706,917 B1 | * | 4/2010 | Chiappetta et al. | 700/245 |
| 7,912,673 B2 | * | 3/2011 | Hebert et al. | 356/603 |

OTHER PUBLICATIONS

U.S. Appl. No. 08/153,972, filed Nov. 18, 1993.
U.S. Appl. No. 08/143,545, filed Oct. 29, 1993.
U.S. Appl. No. 08/514,904, filed Nov. 26, 1993.
U.S. Appl. No. 12/439,242, filed Aug. 31, 2007.
U.S. Appl. No. 12/439,346, filed Aug. 31, 2007.
U.S. Appl. No. 12/566,958, filed Sep. 25, 2009.
U.S. Appl. No. 12/566,985, filed Sep. 25, 2009.
U.S. Appl. No. 12/567,228, filed Sep. 25, 2009.

* cited by examiner

*Primary Examiner* — Gregory J Toatley
*Assistant Examiner* — Juan D Valentin, II
(74) *Attorney, Agent, or Firm* — LaRiviere, Grubman & Payne, LLP

(57) ABSTRACT

The optical device for determining position and orientation of an object comprising a fixed part comprises a laser beam projector with sequential scan and a projection centre (O), defining the centre of a reference frame (R) in space. The projector emits, in a zone comprising at least four sensors fixed to the said object, the four sensors having a known disposition on the object. The instants at which each of the sensors provides an electrical pulse determine the angular directions of the said sensors in the reference frame, the four straight lines passing through the origin and through each of the sensors intercepting an image plane of the fixed part at four projected points. The positions in the image plane of the mappings of the four points determine a geometric shape making it possible to calculate the position and the orientation of the object in space.

14 Claims, 3 Drawing Sheets

OPTICAL SCANNING-BASED SYSTEM FOR DETECTING POSITION AND/OR ORIENTATION OF OBJECTS

PRIORITY CLAIM

This application claims priority to French Patent Application Number 08 05316, entitled Systeme de Detection Par Balayage Optique de Position Et/Ou D'Orientation D'Objets, filed on Sep. 26, 2008.

TECHNICAL FIELD

The present invention relates to the field of devices for optically detecting position and orientation of objects in space. It applies more particularly in the aeronautical field where in this case the detected object is a pilot helmet.

BACKGROUND OF THE INVENTION

The determination of the positioning of a point in space and the determination of the attitude of an arbitrary object are problems relating to numerous technical fields.

The various solutions generally afforded must resolve any ambiguity in position or attitude, cater for more or less severe dynamics of the systems and satisfy high accuracy, in particular in the aeronautical field.

In systems for detecting position and attitude of objects in space catering for an accuracy of a few millimeters in position and degree in attitude, numerous applications exist in various fields.

These systems are used in aeronautics, for detecting head posture, notably for the helmets of fighter aircraft, of military, civilian or para-civilian helicopters. They are also used for the detection of simulation helmets, this detection can then be combined with an oculometry device, also called an eye-tracker, for detecting the position of the gaze. Numerous applications of these systems also exist in the field of virtual reality and games.

A known solution is the use of a video projector projecting in space test grids comprising patterns in a zone comprising an object the kinematics of which are sought. In the latter case the object comprises sensors which can be disposed for example in parallelogram fashion.

Patent WO 2008/028877 describes a method for detecting the orientation and the position of an object in space. This patent describes two variant embodiments.

A first variant embodiment describes a video image projector with laser source illuminating two lineal sensors positioned on a helmet and disposed in parallel in such a way that their ends form a parallelogram. The video image projector projects test grids comprising particular patterns in a zone comprising the sensors.

This first variant makes it possible to perform a first calculation which, on the basis of the points of impact of the laser beams on the lineal sensors, provides the position, in an image plane of the projector, of the mappings of the ends of the sensors. A second calculation makes it possible to provide, on the basis of these projections, the orientation and the position of the parallelogram formed by ends of the sensors.

The second variant embodiment describes a camera filming four light-emitting diodes mounted in parallelogram fashion on an object. A calculation which on the basis of the projected images of these diodes on the image plane of the camera sensor makes it possible to provide the orientation and the position of the parallelogram positioned on the helmet.

Nevertheless these solutions present drawbacks. Notably, the aforementioned first variant embodiment requires bulky devices on the object. Moreover, it may require an objective for angularly expanding the image produced by the imager, of LCOS type for example. Another drawback is that each sensor requires its associated sequential reading device. Finally, the optical signal to be provided is modulated spatially in the form of test grids.

The aforementioned second solution requires at least one camera, namely:
a bidimensional photosensor of mosaic type and its associated sequential reading device;
an objective for forming the images of the four diodes on the plane of the photosensor.

Moreover, the light-emitting diodes positioned on the object emit optical radiation, the source of electrical power consumption. This radiation is, on the one hand, not used by the camera and on the other hand, part of the luminous energy is emitted out of the flight deck rendering the aeroplane configuration detrimental to stealth.

SUMMARY OF THE INVENTION

The invention proposes to solve these problems notably by simplifying the device mounted on the object while ensuring a tempo for the provision of the object's position and orientation data.

Indeed, the invention makes it possible from a fixed point and on the basis of a projector to scan with a laser beam a zone comprising the object, the said object comprising sensors preferably of point-like type, such as photodetectors. The object preferably comprises four sensors forming a parallelogram on the object. The instants of reception of the pulse by each of the sensors correspond to a projection orientation of the beam. The determination of four positions of the mappings of the four sensors in the image plane then makes it possible to determine the position and the orientation of the object in space.

Advantageously, the optical device for determining position and orientation of an object comprises a fixed part of known position comprising a laser beam projector with sequential scan defining the centre (O) of a reference frame (R) in space. The projector scans a beam in a zone comprising at least four point-like sensors fixed to the said object, the orientation of the scan being known at each instant, the four point-like sensors forming a parallelogram.

Advantageously, the instants, at which each of the sensors (A', B', C', D') is scanned by the beam, determine four directions of each of the sensors in the reference frame (R), the four straight lines passing through the origin (O) and having the said directions intercepting an image plane of the fixed part at four projected points (A, B, C, D), the positions in the image plane of the mappings (A, B, C, D) of the four points determining a quadrilateral (ABCD) making it possible to calculate the position and the orientation of the object in space.

Advantageously, the determination of the position and of the orientation of the object in space comprises:
The calculation of the two intersections (E, F), in the image plane, of two pairs of straight lines, each of the straight lines comprising a side of the quadrilateral (ABCD), the straight lines being chosen pairwise on opposite sides of the quadrilateral;
The determination of the components of the rotation of the parallelogram as a function of a reference position of the parallelogram and of the positions of the two intersections (E, F);

The determination of the translation of the sensors forming a parallelogram as a function of the reference position of the parallelogram and of the positions of the two intersections (E, F).

Advantageously, the beam can be point-like, the scan being performed during a determined period in a recurrent manner alternately horizontally and vertically.

Advantageously, in another embodiment, the scan of the zone comprises a first horizontal scan of a vertical linear beam intercepting the sensors at four first instants and a second vertical scan of a horizontal linear beam intercepting the sensors at four second instants, the direction of a sensor in space being determined by two angular positions, one being vertical and the other horizontal.

Advantageously, in a variant embodiment, the point-like sensors are photosensitive surfaces of a linear sensor, of strip type.

Advantageously, in another variant embodiment, the point-like sensors are photosensitive surfaces of a sensor of matrix type.

Advantageously, the projector radiates at fixed power.

Advantageously, the scan of the light beam in the zone is performed in less than 20 ms.

Advantageously, the optical method for determining position and orientation of an object comprises:
  a first initialization step comprising a first scan by the optical device of Claim 1 of a first zone of space and;
  a second tracking step comprising a second scan, following the first scan, of a second zone smaller than the first zone.

BRIEF DESCRIPTION OF THE DRAWINGS

Other characteristics and advantages of the invention will become apparent with the aid of the description which follows, given with regard to the appended drawings which represent.

DETAILED DESCRIPTION OF THE INVENTION

A first embodiment of the invention is embodied on the basis of a laser optical image projector. The latter comprises:
  a laser beam generator of fixed power, such as a laser diode and a collimator;
  a device for angularly deflecting the laser beam with two mutually perpendicular axes;
  it is possible to add in a variant embodiment an angular expansion objective whose optical axis is perpendicular to the two axes of the deflector and which amplifies the angular deflection of the beam. Preferably, this objective focuses the radiation at a distance close to that where the sensors, such as photodetectors, are positioned.

Figure 1:
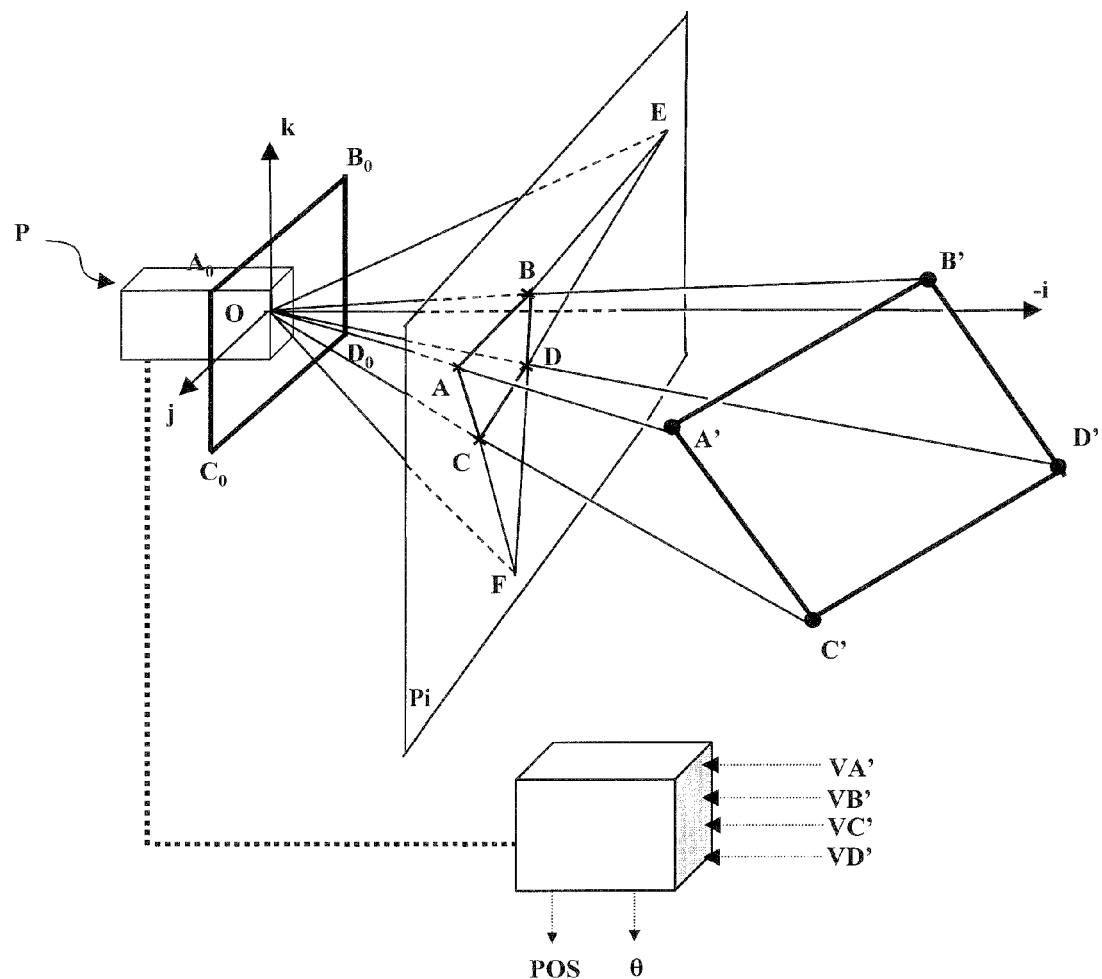
FIG. 1: a scan of a light beam according to the invention in a zone comprising sensors disposed in parallelogram fashion.

FIG. 1 represents four photodetectors A', B', C', D', such as photodiodes, mounted, in one embodiment, in parallelogram fashion on an object, the object not being represented in FIG. 1. The four photodetectors are connected electrically to an electronic device.

A reference frame R(O, i, j, k) whose centre O is the centre of projection of the projector P makes it possible to define a position of a point and an orientation of a direction in space. This reference frame is defined by a projection axis (O, i), termed the principal projection axis, and a plane (O, j, k) perpendicular to the projection axis and parallel to an image plane (Pi). The image plane (Pi) is situated at a predetermined distance from the point O.

The electronic device generates so-called recurrent electrical signals for the control of each of the two axes of the laser angular deflection device at fixed temporal frequencies. Along each axis, the frequencies are, for example, multiples of one another, such as a scan of television type for example.

The electronic device analyses the four electrical signals $V_{A'}$, $V_{B'}$, $V_{C'}$, $V_{D'}$ received from the four photodetectors and extracts recurrent signals therefrom.

In one embodiment, the optical power projector provides a signal with a spatial modulation and a temporal modulation. The temporal modulation may be very simple, for example, the angular deflection may be effected at constant rate by a horizontal and vertical recurrent scan of a narrow light beam with fixed power. This type of scan is also used for television.

The angular position of each of the four sensors in the reference frame R(O, i, j, k) is referenced by the direction of the beam which illuminates the sensor. At given instant, in the reference frame R, the angular position in space of a sensor is referenced by the direction of the beam which illuminates it.

The orientation of a sensor in the reference frame R is given:
  in the vertical direction, by the lag between the start of the vertical scan and the instant at which an optical signal is detected by the sensor and,
  in the horizontal direction, by the lag between the start of the horizontal scan and the instant at which an optical signal is detected by the sensor.

In the case of a laser projector, there is no image formation, so that, if the angular deflection is sufficient, the optical objective is not absolutely necessary.

The electronic device comprises means for calculating the position POS and the orientation θ of the object in the reference frame R(O, i, j, k).

In order to calculate the rotation and the translation performed by the object and therefore of the parallelogram formed of the four points A', B', C', D' in the reference frame R, one considers the image plane Pi perpendicular to the principal projection axis in which the mappings A, B, C, D of the four points A', B', C', D' are considered.

The sensor A', when it is intercepted by a light beam, triggers an electrical pulse $V_{A'}$. The electrical pulse $V_{A'}$ is generated at an instant which corresponds to a scan position of the beam along OA'.

The four pulses $V_{A'}$, $V_{B'}$, $V_{C'}$, $V_{D'}$ are transmitted to the electronic device. The instants of generation of the electrical pulses indicate the orientation of the beam and therefore the direction of each of the sensors, thereby making it possible to obtain the positions in the image plane Pi of the four points A, B, C and D.

The construction in the image plane of the corresponding vanishing points E and F respectively at the intersections on the one hand of the straight lines (AC) and (BD) and on the other hand of the straight lines (AB) and (CD) make it possible to simply express the analytical expressions for the rotation and the translation of the parallelogram A'B'C'D' with respect to a reference parallelogram $A_0B_0C_0D_0$ centred at the point 0 of the reference frame R and included in the plane (O, j, k).

Figure 2:
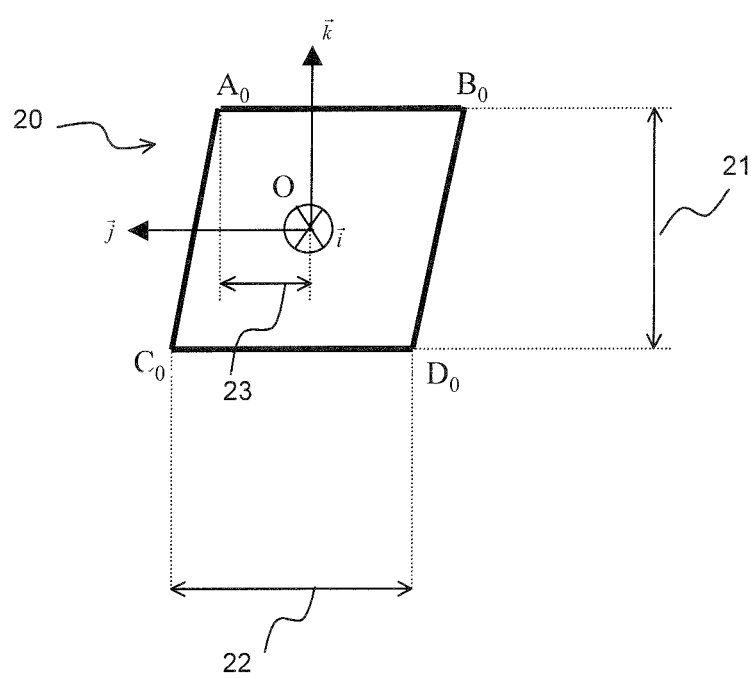
FIG. 2: a disposition of the four sensors forming a reference parallelogram.

FIG. 2 shows an example of a parallelogram 20 with vertices $A_0$, $B_0$, $C_0$ and $D_0$ and whose characteristics are the same as those of the parallelogram A'B'C'D' whose position and orientation in the reference frame R are to be determined. The parallelogram 20 possesses four pairwise mutually parallel sides denoted $A_0B_0$, $C_0D_0$, $A_0C_0$ and $B_0D_0$. The height 21 of the parallelogram is denoted H, its width 22 is denoted L and the coordinate 23 of $A_0$ in the reference frame R along $\vec{j}$ is denoted T.

The four points are defined in R, by the following equations:

$$\overrightarrow{OA_0} = T\vec{j} + \frac{H}{2}\vec{k};$$

$$\overrightarrow{OB_0} = (T-L)\vec{j} + \frac{H}{2}\vec{k};$$

$$\overrightarrow{OC_0} = -\overrightarrow{OB_0};$$

$$\overrightarrow{OD_0} = -\overrightarrow{OA_0}.$$

This reference parallelogram is placed in the reference frame R in such a way that its centre is O. The plane $(O, \vec{j}, \vec{k})$, denoted $P_0$, is parallel to the plane $P_i$ denoted $(X_i, \vec{j}, \vec{k})$, the latter being the image plane. The plane $P_i$ contains the drawing ABCD of the quadrilateral where $X_i$ is the abscissa of the plane along the axis $\vec{i}$.

Knowing the coordinates of the four vertices of the parallelogram A'B'C'D' in R is equivalent to knowing the analytical transformation which makes it possible to deduce A'B'C'D' from the parallelogram 20.

If $A_0$, $B_0$, $C_0$ and $D_0$ denote the points such that A', B', C' and D' are the images of the points $A_0$, $B_0$, $C_0$ and $D_0$ after the rotation and the translation undergone by the mobile object.

Given that the two parallelograms have the same shape, there exists a right-handed vector rotation r in relation to an axis passing through O and a translation $\vec{u}$, r and $\vec{u}$ being single, such that:

$$\overrightarrow{OA'} = \vec{u} + r(\overrightarrow{OA_0});$$

$$\overrightarrow{OB'} = \vec{u} + r(\overrightarrow{OB_0});$$

$$\overrightarrow{OC'} = \vec{u} + r(\overrightarrow{OC_0});$$

$$\overrightarrow{OD'} = \vec{u} + r(\overrightarrow{OD_0});$$

where O is the origin of the reference frame R.

The vectors of the electro-optical device become:

$$\overrightarrow{A'B'} = r(\overrightarrow{A_0B_0});$$

$$\overrightarrow{A'C'} = r(\overrightarrow{A_0C_0})$$

Figure 3:
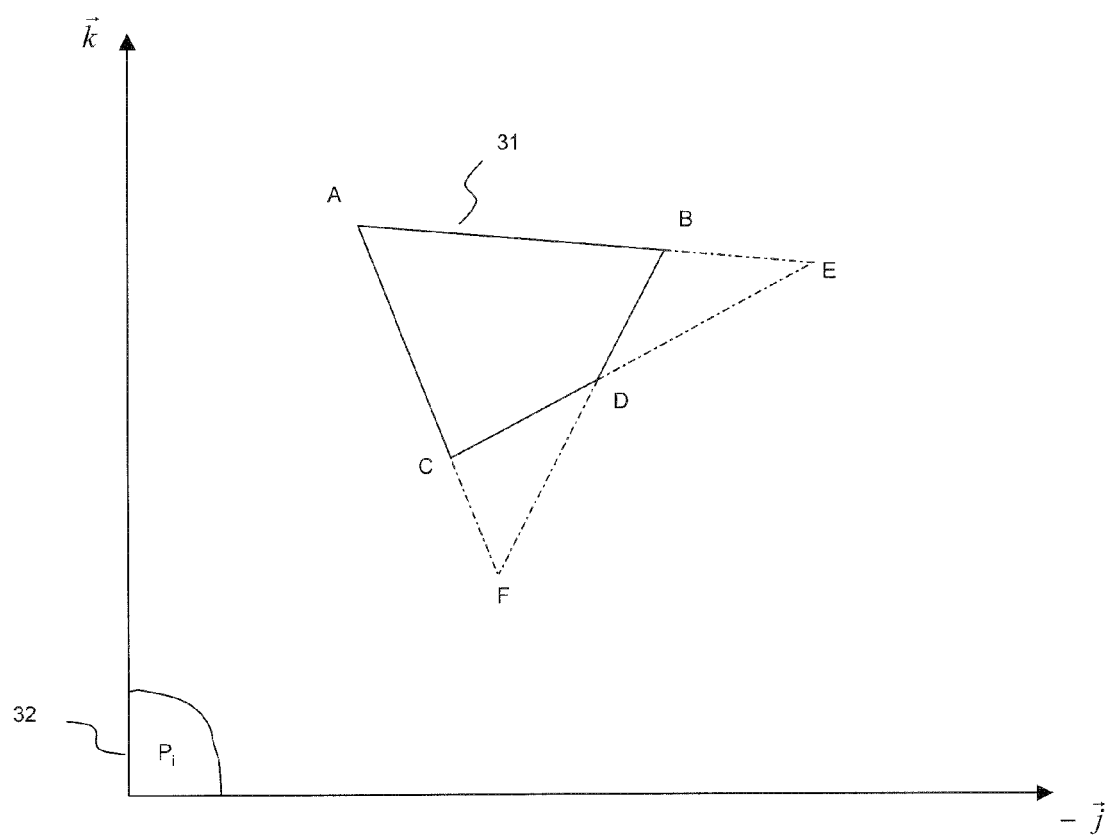
FIG. 3: the drawing in the image plane of the image of the sensors illuminated by a projector.

FIG. 3 represents in the plane $P_i$, the quadrilateral ABCD. When they exist, this corresponding to the most frequent case, the coordinates of the points of intersection of the straight lines (AB) and (CD) and of the straight lines (AD) and (BC) (vanishing points) are determined by knowing the coordinates of the points A, B, C, D in R. The point of intersection of the straight lines (AB) and (CD) is then denoted E and the point of intersection of the straight lines (AD) and (BC) is denoted F. In this case, $\vec{e}$ denotes the vector $\overrightarrow{OE}$ and $\vec{f}$ denotes the vector $\overrightarrow{OF}$.

The points E and F are also called the vanishing points respectively of the straight lines (A'B') and (A'C').

It is known that the vector is positively proportional to $\overrightarrow{A'B'}$ and that the vector $\vec{f}$ is positively proportional to $\overrightarrow{A'C'}$ in R.

We therefore have by construction on the one hand the straight lines (OE) and (A'B') which are parallel and on the other hand the straight lines (OF) and (A'C') which are parallel.

The cases where E does not exist or F does not exist or E and F do not exist, correspond, respectively, to the following relations which ensue from the geometry of the quadrilateral ABCD:

the sides AB and CD are parallel. ABCD is a trapezium in relation to AB, that is to say the side A'B' is parallel to the image plane and the side A'C' is not. We determine $\vec{e} = \overrightarrow{AB}$ and $\vec{f} = \overrightarrow{OF}$.

the sides BC and AD are parallel, ABCD is a trapezium in relation to BC, that is to say the side A'C' is parallel to the image plane and the side A'B' is not; We determine $\vec{f} = \overrightarrow{AC}$ and $\vec{e} = \overrightarrow{OE}$.

ABCD is a parallelogram, that is to say the parallelogram A'B'C'D' is parallel to the image plane. We have the following two relations: $\vec{e} = \overrightarrow{AB}$ and $\vec{f} = \overrightarrow{AC}$.

The following calculations are carried out in the case where E and F exist, the simplifications being made naturally for the particular cases where a determined solution exists for each case.

From $\overrightarrow{A'B'} = r(\overrightarrow{A_0B_0})$, we obtain, with the previous notation: $\overrightarrow{A'B'} = -L \cdot r(\vec{j})$, we deduce that $$r(\vec{j}) = -\frac{\vec{e}}{\|\vec{e}\|},$$

given that $\|\vec{j}\| = 1 \Rightarrow \|r(\vec{j})\| = 1$.

Likewise, from $\overrightarrow{A'C'} = r(\overrightarrow{A_0C_0})$, we obtain, with the previous notation: $\overrightarrow{A'C'} = (L-2T) \cdot r(\vec{j}) - Hr(\vec{k})$, We deduce that:

$$r(\vec{k}) = \frac{q}{H} r(\vec{j}) - \frac{\sqrt{q^2 + H^2}}{H} \frac{\vec{f}}{\|\vec{f}\|},$$

where q=L−2T.

r being a right-handed rotation, we obtain: $r(\vec{i}) = r(\vec{j}) \wedge r(\vec{k})$.

The three respective images of $\vec{i}, \vec{j}, \vec{k}$ under the rotation r are determined as a function of the known characteristics of the parallelogram and of the two vectors $\vec{e}$ and $\vec{f}$.

From $\overrightarrow{OA'} = \vec{u} + r(\overrightarrow{OA_0})$, we derive $$\vec{u} = \overrightarrow{OA'} - T \cdot r(\vec{j}) - \frac{H}{2} \cdot r(\vec{k}).$$

If we call $\mu_E$ the known real such that $\overrightarrow{AE} = \mu_E \overrightarrow{AB}$ and k the real such that $\overrightarrow{OA'} = k \cdot \overrightarrow{OA}$, it then follows that:

$$k = \frac{A'B'}{OE} \cdot |\mu_E - 1|.$$

In the same manner we have $\mu_F$ the real defined by the relation $\overrightarrow{AF} = \mu_F \overrightarrow{AC}$.

The analytical result for the sought-after translation is obtained:

$$\vec{u} = k \cdot \vec{OA} - T \cdot r(\vec{j}) - \frac{H}{2} \cdot r(\vec{k}),$$

with k known.

The parallelogram A'B'C'D' is deduced through the determination of the transformation composed of a known vector rotation and of a known translation of the reference parallelogram $A_0B_0C_0D_0$.

In the case where A'B'C'D' is a lozenge we have additional relation: $|1-\mu_E| \cdot OF = |1-\mu_F| \cdot OE$.

In the case where A'B'C'D' is a rectangle we have additional relation: $(\vec{OE} \cdot \vec{OF}) = 0$.

In the case where A'B'C'D' is a square, the analytical expressions for the transformations of $\vec{i}, \vec{j}, \vec{k}$ under the rotation r are simplified. We obtain: L=H=2×T and the rotation of the vector $\vec{k}$ is determined in a simple manner:

$$r(\vec{k}) = -\frac{\vec{f}}{\|\vec{f}\|}.$$

The two additional relations, corresponding to the case of the lozenge and of the rectangle, are both valid for the case of the square.

The image formation device in the projector is a two-axis deflector which may be for example a deflector with galvanometric mirrors or else a deflector with acousto-optical effect.

In a variant embodiment, the projection objective can be dispensed with, if the amplitude of deflection produced by the deflectors on their own is sufficient.

In a variant embodiment, the projector comprises a spatial light modulator, of for example matrix type, which is activated in such a way that each pixel of the screen of the projector passes successively from a dark state to a bright state.

Another embodiment comprises an optical image projector comprising:
  a cathode ray tube whose electron beam power is kept constant;
  an angular deflection device with two perpendicular axes for the electron beam internal to the cathode ray tube;
    a projection objective which transports the image produced on the screen of the cathode ray tube to a distance close to that where the photodetectors are positioned.

The remainder of the device is identical to that of the first embodiment.

The device according to the invention exhibits numerous advantages.

Notably, the photodiodes mounted on the object are simple and not very bulky devices which moreover do not require accurate orientation.

Furthermore, the calculations are simple, the rotation and the translation of the object are expressed simply by constructing the two vanishing points in the image plane.

The angular amplitude and the central position of the optical radiation can readily be slaved to the restricted spatial zone in which the four photodetectors are situated.

A first initialization and search step in non-slaved mode can be accomplished.

The detection of the kinematics of an object in space can therefore comprise a first initialization step in which the light beam scans a wide zone and then a second slaving step in which the scan is performed in a more restricted zone.

The latter operation makes it possible to decrease the power emitted or to increase its projected spatial density and avoids radiation out of the flight deck.

In another embodiment, the optical power projector provides a, for example linear, polarized radiation. Each photodetector on the helmet is provided with a linear polarizer which improves their detection performance in the presence of disturbing radiation.

Advantageously, employing a laser beam, by virtue of its small geometric extent, provides a projected image with large depth of field. This characteristic allows a larger tolerance to the displacements of the moving object in the direction of the projection axis.

Another embodiment can be embodied with two types of consecutive scans or performed at the same time. A first linear scan is performed horizontally with a vertical beam and a second linear scan is performed vertically with a horizontal beam.

An advantage of such a solution is that the scan is performed more rapidly over the zone to be covered, since the beam is not point-like. On the other hand, each sensor is illuminated at two different instants, an insignificant drawback, as long as the speed of the mobile part remains less than the scan recurrence.

In variant embodiments of the latter case, the angle between the directions of scan of the two linear beams may be different from 90°.

According to the latter case of embodiment, the two beams may be differentiated by different wavelengths or different polarizations.

In a variant, the same projector or two different projectors may be involved.

A favoured application of the invention applies to the detection of the position and the orientation of a pilot helmet in an aircraft cockpit.

The invention claimed is:

1. Optical device for determining position and orientation of an object comprising a fixed part of known position comprising a laser beam projector with sequential scan defining a fixed center of a fixed three-dimensional reference frame in space containing three coordinate axis, the projector scanning at least a beam, each beam being scanned from the fixed center and passing through the fixed center, each scanning a zone comprising at least four point-like sensors fixed to the object, the orientation of the scan being known at each instant, the four point-like sensors forming a parallelogram, wherein the instants, at which each of the sensors is scanned by the beam, determine four directions of each of the sensors in the reference frame, the four straight lines passing through the origin and having the directions intercepting an image plane of the fixe part at four projected points, the positions in the image plane of the mappings of the four points determining a quadrilateral, the optical device having an electronic analyzer for calculating a rotation performed by the object about the three coordinate axis with respect to a reference position of the parallelogram in the fixed three-dimensional reference frame and a translation performed by the object with respect to a reference position of the parallelogram in the fixed three-dimensional reference frame.

2. Optical device for determining position and orientation of an object according to claim 1, wherein the determination of the position and of the orientation of the object in space comprises:

The calculation of the two intersections, in the image plane, of two pairs of straight lines, each of the straight lines comprising a side of the quadrilateral, the straight lines being chosen pairwise on opposite sides of the quadrilateral;

The determination of the components of a rotation of the parallelogram about the three coordinate axis with respect to the reference position of the parallelogram in the fixed three-dimensional reference frame as a function of the reference position of the parallelogram and of the positions of the two intersections;

The determination of a translation of the sensors forming a parallelogram with respect to the reference position of the parallelogram in the fixed three-dimensional reference frame as a function of the reference position of the parallelogram and of the positions of the two intersections.

3. Optical device for determining position and orientation of an object according to claim 1, wherein the projector is adapted to scan a single, point-like beam, during a determined period in a recurrent manner alternately horizontally and vertically.

4. Optical device for determining position and orientation of an object according to claim 1, wherein the scan of the zone comprises a first horizontal scan of a vertical linear beam intercepting the sensors at four first instants and a second vertical scan of a horizontal linear beam intercepting the sensors at four second instants, the direction of a sensor in space being determined by two angular positions, one being vertical and the other horizontal.

5. Optical device for determining position and orientation of an object according to claim 1, wherein the point-like sensors are photosensitive surfaces of a linear sensor, of strip type.

6. Optical device for determining position and orientation of an object according to claim 1, wherein the point-like sensors are photosensitive surfaces of a sensor of matrix type.

7. Optical device for determining position and orientation of an object according to claim 1, wherein the projector radiates at fixed power.

8. Optical device for determining position and orientation of an object according to claim 1, wherein the scan of the light beam in the zone is performed in less than 20 ms.

9. Optical method for determining position and orientation of an object, wherein it comprises:
a first initialization step comprising a first scan by the optical device of claim 1 of a first zone of space and;
a second tracking step comprising a second scan, following the first scan, of a second zone smaller than the first zone.

10. The optical device of claim 1, wherein the scan of the zone comprises a first scan of a first linear beam, in a first direction, intercepting the sensors at four first instants and a second scan of a second linear beam, in a second direction, intercepting the sensors at four second instants, an angle between the first and the second direction being different from zero.

11. The optical device of claim 10, wherein the angle between the first and the second direction is 90° C.

12. The optical device of claim 1, wherein when in the reference position, the parallelogram is in a plane perpendicular to a projection axis of the projector and centered at the fixed center, 13. The optical device of claim 1, wherein the projector scans at most two beams.

14. The optical device of claim 1, wherein the projector scans a single point-like beam.

* * * * *